Feb. 20, 1962 N. A. MILAS 3,022,352
ORGANIC PEROXIDES AND METHODS OF MAKING THEM
Original Filed March 22, 1954
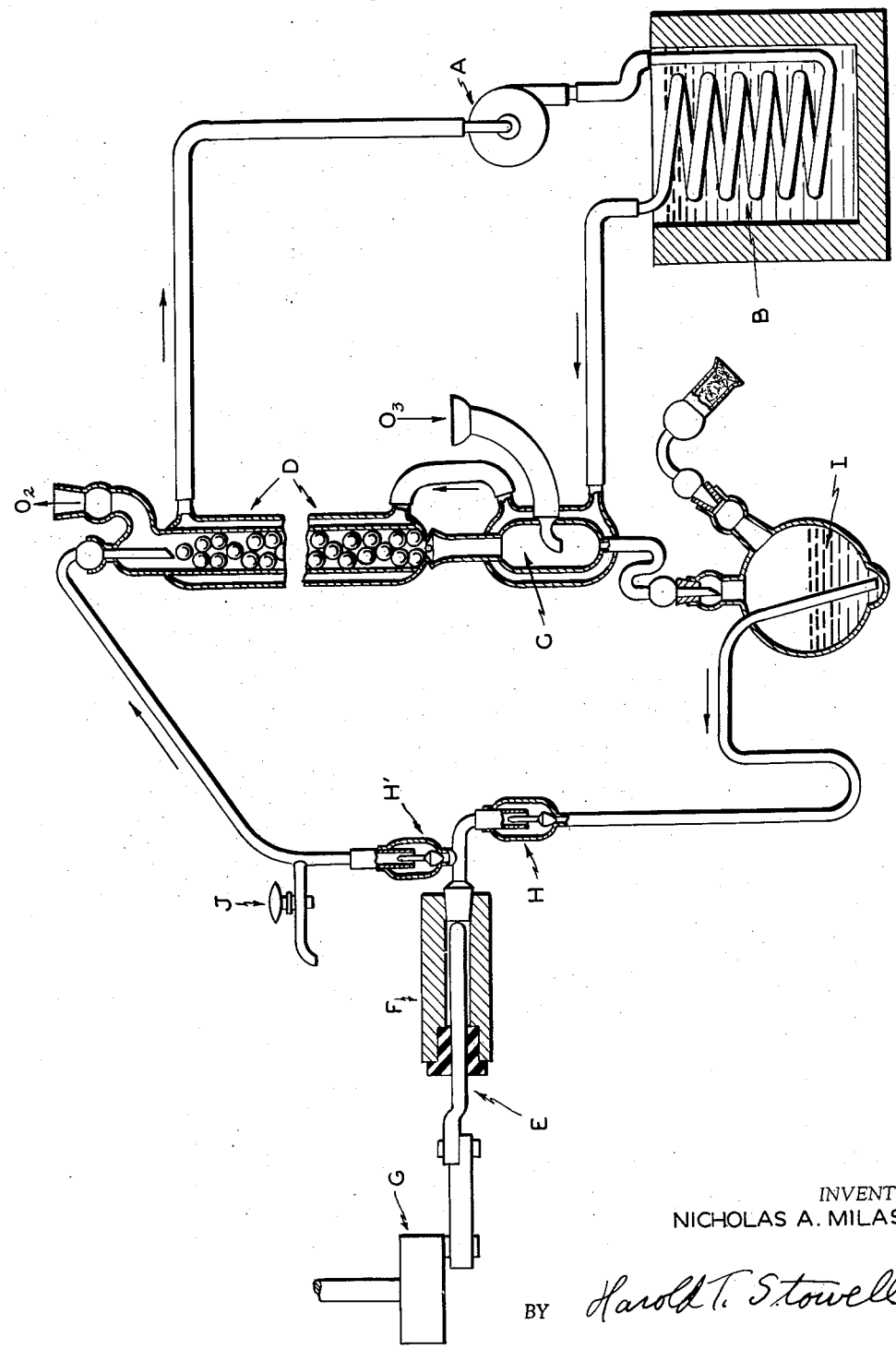
INVENTOR
NICHOLAS A. MILAS
BY Harold T. Stowell
ATTORNEY

United States Patent Office 3,022,352
Patented Feb. 20, 1962

3,022,352
ORGANIC PEROXIDES AND METHODS OF MAKING THEM
Nicholas A. Milas, Belmont, Mass., assignor to Research Corporation, New York, N.Y., a corporation of New York
Continuation of application Ser. No. 417,860, Mar. 22, 1954. This application Jan. 25, 1960, Ser. No. 5,089
9 Claims. (Cl. 260—610)

This invention relates to a method of making organic peroxides and to novel organic peroxides produced thereby.

When ozone is allowed to react with organic compounds containing carbon to carbon unsaturated bonds in inert solvents such as chloroform, carbon tetrachloride, etc., ozonides are produced which, as a rule, are unstable and highly explosive, and therefore difficult to utilize industrially. Several investigators have shown that ozonization reactions are ionic reactions. In the present invention, the intermediate ions are caused to react with carbonium ions producing organic peroxides which are more stable, less explosive and easier to handle than ozonides. The peroxides formed in accordance with the present invention depend upon the groups attached to the carbon atoms joined by the double bonds.

In general, the peroxides of the invention may be represented by the formulas

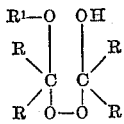

and

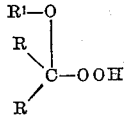

wherein R is selected from the group consisting of hydrogen and hydrocarbon radicals, at least one R being a hydrocarbon radical, and $R^1$ is a hydrocarbon radical.

The peroxides of the invention are effective catalysts in polymerization reactions and are also useful in raising the cetane number of diesel fuels.

The mechanism of the reactions may be illustrated as follows:

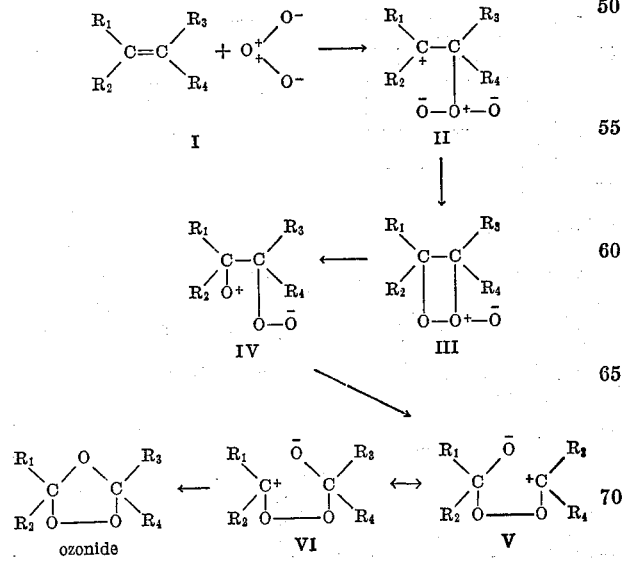

All ionic intermediates are probably formed instantaneously with compounds V and VI existing in resonance together with the final neutral ozonide. If there are no other ionic species present to combine with either V or VI, either a neutral ozonide is formed or these ions decompose spontaneously into ketones or aldehydes and zwitterions VII and VIII which dimerize to form the highly explosive alkylidene peroxides IX and X.

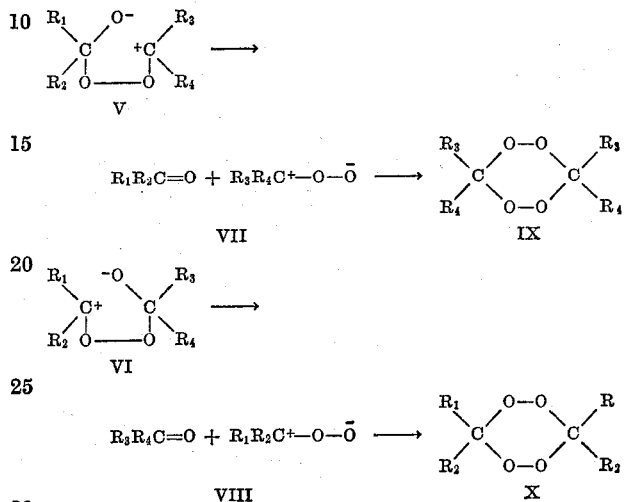

However, if tertiary carbonium ions are present during ozonization, neither ozonides nor peroxides IX or X but peroxides of the type XI and XII are formed. That they have the structure assigned to them has been determined by analysis, infrared spectra and degradation experiments. In the presence of excess mineral acids or under very high vacuum ($10^{-2}$ mm. or less) these peroxides decompose slowly to give another type of peroxide illustrated by XIII and XIV.

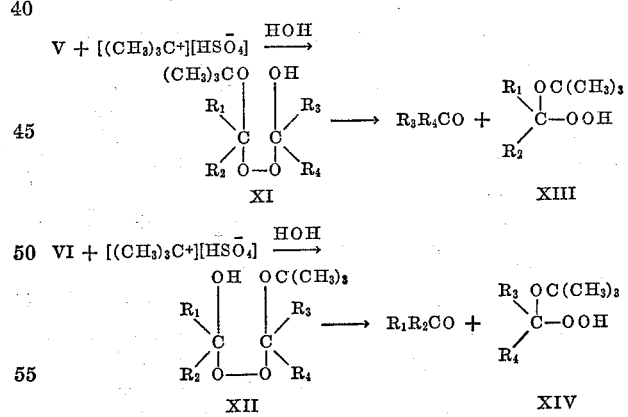

The final peroxides formed in these reactions depend upon the nature of the groups $R_1$, $R_2$, $R_3$ and $R_4$ which are at least in part hydrocarbon radicals.

A specific illustration using α-methyl styrene will further illustrate the principles of the invention:

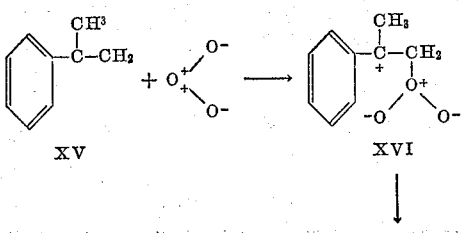

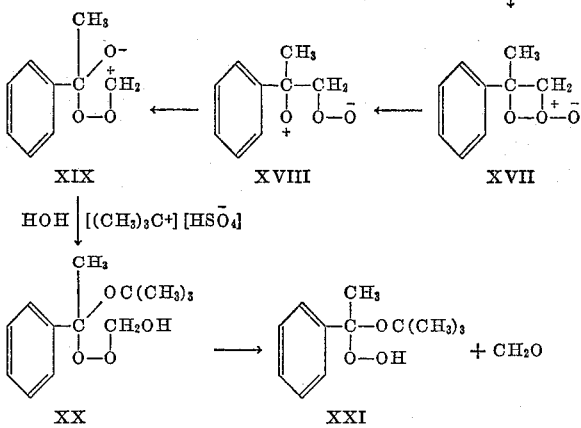

The resonance form of XIX produces peroxides XXII and XXIII.

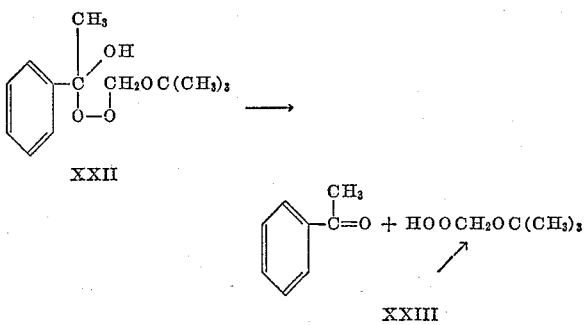

The method of the invention is not limited to the use of tertiary carbonium ions; other carbonium ions (see, for example, Chapter III of "Principles of Ionic Organic Reactions" by E. R. Alexander, John Wiley and Sons, Inc., New York, 1950) may be used but the use of acids, such as sulfuric acid, is preferable to acidic compounds such as aluminum chloride and boron trifluoride, in forming carbonium ions in the process of the invention as the latter compounds cause undesirable secondary reactions. The reactant unsaturated compounds themselves may be the source of the carbonium ions.

For example, using α-methyl styrene and 80% sulfuric acid to form carbonium ions the reaction goes as follows:

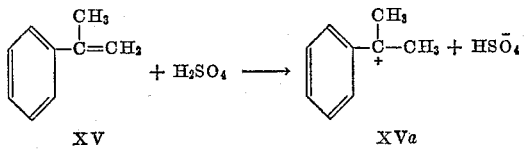

Zwitterions XVIII and XIX then react simultaneously with the carbonium ion XVa and water to form the final peroxides XXVII and XXVIII which break down in the same manner as analogous peroxides were shown to break down in the foregoing.

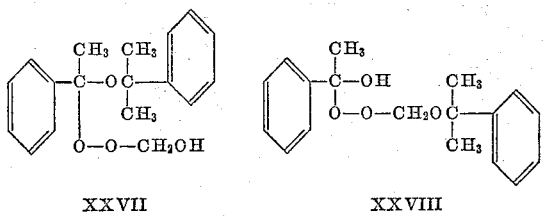

In an analogous manner any unsaturated hydrocarbon may be used to produce its own carbonium ions.

Ozonization reactions typically have been carried out by merely bubbling ozone through solutions of substances to be ozonized. This method is not adaptable to large scale operations since large accumulation of ozonide frequently leads to disastrous explosions. A more practical process and one easily adapted to large scale operations is the countercurrent circulating method herein described with reference to the accompanying drawing which shows diagrammatically apparatus suitable for practicing the process of the invention. It comprises two independent circulatory systems. One consists of a circulating pump A and a coil B, immersed in a bath which is usually kept at 0° but may be anywhere between room temperature and −70° C. depending upon the temperature desired for the ozonization. The coolant (ethylene glycol, or any othere suitable liquid) circulates around the reaction chamber C, then around a column D filled with glass beads to increase the surface, then back to the pump A. This provides a very efficient cooling system.

The other circulating system includes a solid glass piston E machined to fit into a block of Teflon F which is not attacked by ozone. The piston E is attached to an eccentric G which is actuated by a motor of variable speed. On the other side of the Teflon block is a ground glass joint which is sealed as shown to two ground glass valves H and H'.

The product to be ozonized may be dissolved in tert-butyl alcohol containing enough sulfuric acid to produce one mole of tert-butyl carbonium ions per double bond present in the compound to be ozonized. The mixture is placed in a flask I which can be refrigerated if necessary and from which the solution is pumped and circulated through the column and the reaction chamber. The stopcock J serves as a convenient outlet for withdrawing samples for following the course of ozonization.

To determine the rate which ozone is converted into stable organic peroxides, the latter may be determined quantitatively by the iodometric method and the values compared with the amount of ozone used. This may be accomplished by using a constant flow of oxygen through the ozonator (not shown) and determining the ozone formed by unit time. The peroxides formed may also be isolated and analyzed for active oxygen. Typical values thus obtained compared with those calculated on the basis that one mole of ozone was converted to one mole of peroxide of the type XI or XII are shown in Table I.

TABLE I

*Primary organic peroxides formed by the ozonization of olefins in the presence of tert-butyl carbonium ions*

| Olefin | Yield of active oxygen per mole of $O_3$ used (in percent) | Peroxide isolated | Active oxygen (O) (in percent) | |
|---|---|---|---|---|
| | | | Calcd. | Found |
| 2-Methyl-butene-2 | 45.0 | $C_9H_{20}O_4$ | 8.33 | 7.20 |
| Tetramethylethylene | 57.0 | $C_{10}H_{22}O_4$ | 7.76 | 8.0 |
| Styrene | 90.0 | $C_{12}H_{18}O_4$ | 7.10 | 7.20 |
| α-Methylstyrene | 86.0 | $C_{13}H_{20}O_4$ | 6.67 | 6.60 |
| D-Limonene | 85.7 | $C_{14}H_{26}O_4$ | 6.20 | 5.50 |
| p-Menthene-8 | } 68.0 | $C_{14}H_{26}O_4$ | 6.16 | 6.0 |
| p-Menthene-4 | | | | |

Although the primary peroxides of the type XI and XII are stable for long periods of time, their acyl derivatives are much more stable and benzoylation, acetylation or acylation with other carboxylic acids increases the stability of all the peroxides disclosed in the present application. When the primary peroxides of the type XI and XII are subjected to a high vacuum pumping ketones or aldehydes are evolved and the peroxides go over to another type of peroxides XIII and XIV. The amount of each of these peroxides formed depends upon the groups originally attached to the double bond. For example from α-methyl styrene peroxide XXI forms in larger amounts than peroxide XXIII which usually distills over and is caught in a Dry Ice trap. Table II shows some of these peroxides together with typical analytical values.

TABLE II

*Secondary peroxides obtained from the primary peroxides*

| Peroxide | $n_D^{25°}$ | Active oxygen (O) (in percent) | |
|---|---|---|---|
| | | Calcd. | Found |
| $(CH_3)_2\overset{OC(CH_3)_3}{\underset{}{C}}-OOH$ | 1.4250 | 10.8 | 11.1 |
| phenyl-$\overset{CH_3\ OC(CH_3)_3}{\underset{}{C}}-OOH$ | 1.5024 | 7.6 | 7.9 |
| $CH_3$-cyclohexyl with $OC(CH_3)_3$ and $OOH$ | -------- | 7.9 | 8.0 |
| $(CH_3)_3COCH_2OOH$ | 1.4131 | 13.32 | 12.97 |

The following specific examples will further illustrate the principles of the invention.

EXAMPLE 1

To a solution of 100 cc. of tert-butyl alcohol containing 125 g. of 80% sulfuric acid is added 14 g. of 2-methylbutene-2 and the mixture is ozonized in the countercurrent apparatus shown in the drawing for four hours at a temperature of 10–15° C. and at a rate of about 0.022 mole of ozone per hour. The reaction mixture is then removed mixed with 60 cc. of ethyl ether and 10 cc. of water and shaken with excess magnesium carbonate containing 40% magnesium oxide to remove the acid present in the mixture. Finally, the mixture is dried over magnesium sulfate, filtered and the solvent removed under reduced pressure (20 mm.). About 45% of the ozone used is recovered as organic peroxide having an active oxygen content of 7.2% (calcd. for $C_9H_{20}O_4$, 8.33%).

EXAMPLE 2

A solution of 200 cc. of tert-butyl alcohol containing 14.3 g. of 70% sulfuric acid and 16.8 g. of tetramethylethylene is ozonized countercurrently in the apparatus of the drawing for five hours at temperatures of 10–15° C. To the reaction mixture is then added 10 cc. of water and excess of magnesium carbonate containing about 40% magnesium oxide. The mixture is well shaken to allow complete neutralization of the acid present therein, then filtered and concentrated under reduced pressure. The residue was taken up in ether, the ethereal solution dried over magnesium sulfate, filtered and the ether removed under reduced pressure (20 mm.). A yield of about 57% of peroxide is recovered based on the ozone used. The peroxide has an active oxygen content of 8.0% (calcd. for $C_{10}H_{22}O_4$, 7.76%).

When the above peroxide is subjected to a pressure of $10^{-2}$ mm. and at temperatures of about 25–30°, it decomposes into acetone and another peroxide with has an $n_D^{25°}$, 1.4250 and an active oxygen content of 11.1% (calcd. for $C_7H_{16}O_3$, 10.8; see Table II).

EXAMPLE 3

A mixture of 200 cc. of tert-butyl alcohol containing 6.1 g. of 80% sulfuric acid and 5.2 g. (0.05 mole) of styrene is ozonized countercurrently in apparatus shown in the figure for two hours at 14–17° C. and at the rate of 0.02 mole of ozone per hour. To the product is then added 10 cc. of water and excess magnesium carbonate containing about 40% of magnesium oxide. The mixture is well shaken, filtered and most of the solvent removed under reduced pressure. A yield of 0.0367 mole of peroxide is produced which corresponds to about 90% of the ozone used. The product is then taken up in ether and the ethereal solution further dried over anhydrous magnesium sulfate, filtered and the solvent and low boiling products removed under reduced pressure (5 mm.). The viscous residue has active oxygen (O), 7.2% (calcd. for $C_{12}H_{12}O_4$, 7.1%).

EXAMPLE 4

A mixture of 200 cc. of tert-butyl alcohol containing 12.5 g. of 80% sulfuric acid and 13 g. of α-methylstyrene is ozonized by the countercurrent method described in Examples 1, 2 and 3 for four hours at 15–17° C. and at a rate of about 0.022 mole of ozone per hour. The product is then mixed with 30 cc. of water and 100 cc. of ether and excess magnesium carbonate containing 40% magnesium oxide. The mixture is well shaken to remove all acid present, dried over magnesium sulfate, filtered and the total active oxygen determined. A yield of 86% is obtained based on the amount of ozone used. The solvent is then removed under reduced pressure (5 mm.) and room temperature. The viscous, non-volatile residue has an $n_D^{27°}$, 1.4956 and is a mixture of peroxides XX and XXII.

When the mixture of primary peroxides XX and XXII is subjected to a high vacuum ($10^{-2}$ mm.) at about 30° C. they decompose into the peroxides XXI and XXIII respectively with the latter distilling over together with acetophenone and formaldehyde. The peroxide XXI is non-volatile under these conditions and remains in the distilling flask as a highly viscous residue; $n_D^{25°}$, 1.5024.

Peroxide XXIII has the following properties: $n_D^{25°}$, 1.4141; B.P. 31–33° (4 mm.).

EXAMPLE 5

A mixture of 100 cc. of tert-butyl alcohol containing 12.5 g. of 80% sulfuric acid and 13.5 g. of D-limonene is ozonized countercurrently for three hours in the apparatus referred to in the previous examples at 15–17° C. and at a rate of about 0.028 mole of ozone per hour. The product is then diluted with 150 cc. of ethyl ether and 30 cc. of water and the total active oxygen determined. A yield of 85.7% is obtained based on the ozone used. The mixture is then treated with excess magnesium carbonate containing about 40% magnesium oxide, dried with magnesium sulfate, filtered and the solvent removed under reduced pressure (2 mm.). The highly viscous residue contains active oxygen; (O), 5.5%; (calcd. for $C_{14}H_{26}O_4$, 6.2%).

EXAMPLE 6

A mixture of 100 cc. of tert-butyl alcohol containing 12.5 g. of 80% sulfuric acid and 13.8 g. of p-menthene-4 containing some p-menthene-8 is ozonized countercurrently in the apparatus referred to in the previous examples at 15–17° C. and at a rate of about 0.022 mole of ozone per hour. A yield of 68% of active oxygen is obtained based on the total ozone used. The product is treated as in the case of Example 5 with magnesium carbonate containing about 40% of magnesium oxide, dried with magnesium sulfate, filtered and the solvent removed under reduced pressure (2 mm.). The residue contains active oxygen; (O), 6.0%; (calcd. for $C_{14}H_{28}O_4$, 6.16%).

The benzoate of this peroxide is prepared by treating 10 g. of it in 50 cc. of anhydrous ether with 7 g. of benzoyl chloride and 5 g. of pyridine at 0° C. At the end of the reaction the mixture is treated with excess ice and the ether layer extracted with excess aqueous tartaric acid then with sodium bicarbonate solution and dried over magnesium sulfate, filtered and the solvent removed under reduced pressure (2 mm.); yield, 12.6 g.; (O), 3.7%; (calcd. for $C_{21}H_{31}O_5$, 4.4%). This benzoate is much more stable for long periods of time than the original peroxide.

When the original peroxide is subjected to a high vacuum ($10^{-3}$ mm.) at about 30° C., another peroxide is formed which has an active oxygen content of 8.0%

(calcd. for $C_{11}H_{12}O_3$, 7.9%). The infrared spectrum of this peroxide shows the presence of a tert-butyl group, an ether linkage and a hydroperoxy group. Active hydrogen determination shows the presence of 0.95 active hydrogen (calcd. for $C_{11}H_{12}O_3$, 1.00).

This application is a continuation of my application Serial No. 417,860, filed March 22, 1954 and now abandoned.

I claim:
1. Organic peroxides of the group consisting of peroxides of the formulas

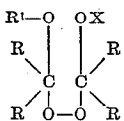

and

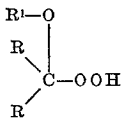

wherein R is a member of the group consisting of hydrogen, alkyl radicals and monocyclic hydrocarbon radicals, at least one R being a hydrocarbon radical, $R^1$ is a member of the group consisting of alkyl radicals and monocyclic hydrocarbon radicals, and X is a member of the group consisting of hydrogen and carboxylate radicals of acids selected from the group consisting of benzoate and lower monocarboxylic alkanoates.

2. Organic peroxides of the formula

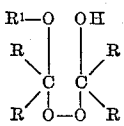

wherein R and $R^1$ represent monocyclic hydrocarbon radicals.

3. Organic peroxides of the formula

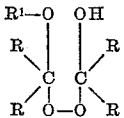

wherein the R's represent monocyclic hydrocarbon radicals and $R^1$ represents an alkyl radical.

4. Organic peroxides of the formula

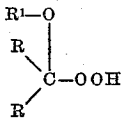

wherein R and $R^1$ represent monocyclic hydrocarbon radicals.

5. Organic peroxides of the formula

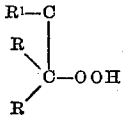

wherein $R^1$ represents an alkyl radical and the R's represent monocyclic hydrocarbon radicals.

6. Organic peroxides of the formula

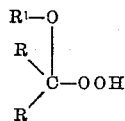

wherein one R represents hydrogen and the other R and $R^1$ represent monocyclic hydrocarbon radicals.

7. Organic peroxides of the formula

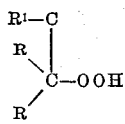

wherein one R represents hydrogen and the other R represents a monocyclic hydrocarbon radical and $R^1$ represents an alkyl radical.

8. A method of making organic peroxides of the formula

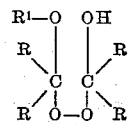

wherein R is a member of the group consisting of hydrogen, alkyl radicals and monocyclic hydrocarbon radicals, at least one R being a hydrocarbon radical and $R^1$ is a member of the group consisting of alkyl radicals and monocyclic hydrocarbon radicals, which comprises contacting a hydrocarbon of the formula

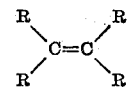

with ozone in the presence of a carbonium ion in amount substantially equimolecularly equivalent to the ozone.

9. A method of making organic peroxides of the formula

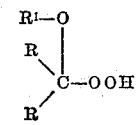

wherein R is a member of the group consisting of hydrogen, alkyl radicals and monocyclic hydrocarbon radicals, at least one R being a hydrocarbon radical and $R^1$ is a member of the group consisting of alkyl radicals and monocyclic hydrocarbon radicals, which comprises subjecting an organic peroxide of the formula

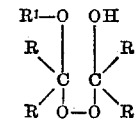

to the action of a vacuum of at least $10^{-2}$ mm. of mercury.

References Cited in the file of this patent
UNITED STATES PATENTS 2,115,207  Milas _____ Apr. 26, 1938
2,665,280  Knobloch et al. _____ Jan. 5, 1954